United States Patent [19]

Shikano et al.

[11] Patent Number: 4,585,485
[45] Date of Patent: Apr. 29, 1986

[54] REFRACTORY SLIDING NOZZLE PLATE

[76] Inventors: Hiroshi Shikano, 3-24-6 Hiyoshidai, Yaha a Nishi-Ku; Tsutomu Harada, 1612-4 Ohaza Kumade, Yahata Nishi-Ku, both of Kyushu, Japan

[21] Appl. No.: 460,464
[22] Filed: Jan. 24, 1983
[51] Int. Cl.$^4$ .................. C04B 35/48; C04B 35/52
[52] U.S. Cl. ..................... 106/38.9; 106/38.8; 501/99; 501/100; 501/105; 164/12; 164/526; 523/139; 523/145
[58] Field of Search ............... 106/38.8, 38.9; 501/99, 501/100, 105; 164/12, 526; 523/139, 145

[56] References Cited

U.S. PATENT DOCUMENTS

| 3,752,372 | 8/1973 | Mitchell | 501/100 |
| 3,754,950 | 8/1973 | Cevales | 501/105 |
| 3,782,980 | 1/1974 | Smith | 501/105 |
| 4,059,662 | 11/1977 | Murakami et al. | 501/99 |
| 4,139,394 | 2/1979 | Esnoult | 501/105 |
| 4,292,049 | 9/1981 | Tanaka et al. | 501/105 |
| 4,326,040 | 4/1982 | Kaji et al. | 501/105 |

FOREIGN PATENT DOCUMENTS 123860   8/1982   Japan ........................ 501/100

Primary Examiner—Maurice J. Welsh
Assistant Examiner—Garnette D. Draper
Attorney, Agent, or Firm—Armstrong, Nikaido, Marmelstein & Kubovcik

[57] ABSTRACT

A refractory for use in casting of molten metal which essentially comprises refractory material comprising corundum and monoclinic zirconia as principal mineral phase and including $Al_2O_3$ and $ZrO_2$, silicon-containing powder and carbon-containing powder and which optionally includes first additional refractory material comprising mullite, baddellite and corundum as principal mineral phase and including $Al_2O_3$, $ZrO_2$ and $SiO_2$, one or more second additional refractory materials and/or alumina.

10 Claims, No Drawings

REFRACTORY SLIDING NOZZLE PLATE

BACKGROUND OF THE INVENTION

This invention relates to refractories having high durability for use in the casting of molten metals and, more particularly, to refractory sliding nozzle plates formed of the refractories.

Refractory sliding nozzle plates which are employed as components in the so-called sliding nozzle system (the system will be referred to as "SN system" hereinafter). The SN system includes a plurality of refractory brick or refractory plates having nozzle openings through which a flow of molten metal passes and the plates slide relative to each so as to open and close their nozzle openings. The system has been widely utilized as an effective means for controlling the flow rate of molten metal and especially, the SN system has been most employed as a flow rate control means for a flow of molten pig iron or steel in the iron and steel industry where refractory parts in the system have been subjected to more and more severe operation conditions. The SN system generally comprises three principal components, that is, an upper refractory nozzle, at least two or upper and lower slidable refractory plates and a lower refractory nozzle which are designed to perform their respectively expected functions. Among the principal components of the SN system, the refractory plates function to control the flow rate of molten metal and are required to have high surface preciseness, wear-resistance and refractoriness. The SN system refractory plates are subjected to physical actions such as abrupt thermal impact and wear from the molten metal flow as well as physical and chemical corrosive actions from the molten metal and slag and thus, the refractory plates are generally required to possess spalling and corrosion resistances and sufficient strength.

Hitherto, efforts have been made to coordinately impart the SN system refractory plates with the above-mentioned properties and in most cases, as the principal material of the SN system refractory plate, alumina is fired to a temperature within the range of 1300°–1800° C. to provide oxide ceramic bond. In order to improve the durability of the SN system refractory plate formed of such oxide ceramic bond, of late, such a plate has been impregnated with coal tar pitch or the like, but the refractory plate impregnated with coal tar pitch has the disadvantage that the volatile matter or matters in the coal tar pitch emit smoke and offensive smell to substantially pollute the environment when the refractory plate is used for its intended purpose. Of late, in order to eliminate the disadvantage inherent in the oxide ceramic bond impregnated with coal tar pitch or the like, a non-fuming alumina carbon which is not impregnated with coal tar pitch or the like, but maintains its high durability has been developed as the material of the SN system refractory plate. The non-fuming alumina carbon exhibits a durability higher than that of the oxide ceramic bond and has been more widely employed than the latter. The present invention is directed to not only such non-fuming alumina carbon refractories for the SN system plates, but also refractories impregnated with coal tar pitch and/or resins for the SN system refractory plates within the scope of the present invention.

The SN system refractory plates are designed to be heated about the nozzle openings therein by the heat from a flow of molten metal such as steel and employed with an uneven temperature distribution therein and thus, when the refractory plates have a high coefficient of thermal expansion, the upper and lower refractory plates tend to lose their closely contacting relationship which would result in the acceleration of surface roughening and the occurrence and/or enlargement of a crack or cracks in the nozzle openings in the plates. Therefore, in order to improve the durability of the SN system refractory plates, it is considered that the lowering of coefficient of thermal expansion of the refractory plates is an effective means. The requirement for lowering the coefficient of thermal expansion for the SN system refractory plates is also applicable to the long nozzle connecting between the laddle, tandish and mould and to the immersion nozzle in the SN system.

SUMMARY OF THE INVENTION

According to one aspect of the present invention, there has been provided a refractory sliding nozzle plate for use in casting of molten metal which comprises, based on the weight of said refractory, 5–90% by weight of refractory material comprising corundum and monoclinic zirconia as principal mineral phase and having the composition including 80–98% by weight of $Al_2O_3$ and 2–20% by weight of $ZrO_2$ based on the weight of said refractory material; 1–10% by weight of silicon-containing powder containing at least 80% by weight of silicon based on the weight of said powder and having a particle size less than and up to 100 mesh; and 1–15% by weight of carbon powder containing at least 80% by weight of fixed carbon based on the weight of said carbon powder and having a particle size less than and up to 100 mesh.

According to another aspect of the present invention, the refractory sliding nozzle plate further comprises, based on the weight of the refractory, up to 40% by weight of a first additional refractory material comprising mullite, baddellite and corundum as principal mineral phase and having the composition including, based on the weight of the first additional refractory material, 30–80% by weight of $Al_2O_3$, 10–65% by weight of $ZrO_2$ and 5–25% by weight of $SiO_2$, up to 85% by weight of alumina containing at least 90% by weight of $Al_2O_3$ based on the weight of the alumina; and/or up to 30% by weight of at least one second additional refractory material containing at least 50% by weight of $Al_2O_3$ and at least 10% by weight of $SiO_2$ based on the weight of the second optional refractory materials.

The sliding nozzle plate is produced by admixing the components of the refractory referred to above in the presence of a binder, kneading the mixture, forming the mixture into a predetermined shape and firing the formed product in a non-acidic environment.

In the refractory sliding nozzle plate of the present invention, the essential refractory material which comprises corundum and zirconia as the main mineral phase and has the chemical composition including, by weight based on the refractory material, 80–98% by weight of $Al_2O_3$ and 2–20% by weight of $ZrO_2$ (the refractory material will be referred to "AZ material" hereinafter) means a refractory material which has the composition in which monoclinic zirconia is dispersed within corundum crystalline particles and as compared with the ordinary corundum material, exhibits a slightly different particle strength, a substantially lower coefficient of thermal expansion and superior heat and impact resistances. Properties of the AZ material will be shown in the following Table 1.

TABLE 1

| Material | Properties of AZ Material | | |
|---|---|---|---|
| | Corundum (electrofused) | AZ-4 (electrofused) | AZ-9 (electrofused) |
| Particle size | 2.5–3.5 mm | 2.5–3.5 mm | 2.5–3.5 mm |
| Chemical $Al_2O_3$ | 99.5 | 95 | 87 |
| component (% by wt) $ZrO_2$ | — | 5 | 13 |
| Particle breaking strength (load by Kg) | 50 | 75 | 130 |
| Thermal expansion (Note 1) (%) at 1000° C. | +0.81 | +0.77 | +0.75 |
| Spalling-resistance (Note 2), heating at 1200° C. ⇌ water cooling cycle repetition | Spalling occurred after eight cycles | No spalling occurred even after ten cycles | No spalling occurred even after ten cycles |

Note 1:
The material was ground to 325 μ, kneaded by the use gum arabic and formed into a predetermined specimen shape suitable for measurement. The specimen was dried at 110° C. for 24 hours to provide a specimen for expansion test.

Note 2:
A powdery mixture comprising 50% by weight of particles of 1–3 mm, 20% by weight of particles of 0.2–1 mm and 30% by weight of particles up to 0.074 mm was added thereto 2% by weight of phenol resin based on the mixture. The resultant mixture was kneaded, formed in a conventional mould and then fired to provide a specimen for test.

The reason for which the amounts of the chemical components in the composition of the AZ material are specified as shown in Table 1 is that when the amount of $Al_2O_3$ is less than 80% by weight based on the weight of the AZ material, the useful properties which corundum material usually possesses such as strength and hardness are substantially reduced and on the other hand, when the amount of $Al_2O_3$ is an excess of 98% by weight, the properties of the AZ material superior to those of the conventional corundum material as mentioned hereinabove such as heat-, impact- and corrosion-resistances are not apparently exhibited. Similarly, when the amount of $ZrO_2$ is less than 2% by weight based on the weight of the AZ material, the effect expected by the inclusion of the $ZrO_2$ in the AZ material is little and on the other hand, when the $ZrO_2$ is employed in excess of 20% by weight, the particle strength is reduced and the volume of $ZrO_2$ (monoclinic system) varies rapidly and unevenly which makes it difficult to produce refractory or brick. The most preferable amount range of $ZrO_2$ is 4–15% by weight based on the weight of the AZ material. The AZ material is usually produced by electrofusing or sintering, but since the production process of the AZ material does not constitute a part of the present invention, description of such process will be omitted herein. However, from the consideration of technical and price aspects at present, the electrofusing in an electric furnace is more advantageous. Although corundum and monoclinic zirconia have been illustrated as the principal mineral phase minerals, the present invention is not limited to such materials as principal minerals, but a small amount of cubic zirconia and/or $Al_2O_3$—$SiO_2$ system glass may be contained as impurities at the interface between particles without varying the properties of the AZ material substantially.

Next, as to the amount of the AZ material to be employed in the refractory of the present invention, when the AZ material is less than 5% by weight based on the weight of the refractory, the AZ material will not exhibit the various useful properties as mentioned hereinabove and on the other hand, when the amount of the AZ material is in excess of 90% by weight, the amounts of other essential components to be included in $Al_2O_3$—C system refractory in proportion to the AZ material have to be reduced accordingly resulting in unbalance between desired properties of the refractory.

Next, the first additional refractory material comprising the chemical composition formed of mullite, baddellite and corundum as the principal mineral phase is clinker produced by fusing zircon and alumina is principal components or clinker produced by fusing zircon and alumina with the addition of baddellite thereto. However, the refractory material is not limited to the fused product, but may be a product produced by firing zircon and alumina or zircon and alumina with the addition of baddellite thereto at a temperature above 1500° C. and grinding the fired product to a desired particle size (the refractory material will be referred to as "ZRM material" hereinafter).

In the ZRM material, fine zirconia crystals deposit within the interior and on the outer surface of the corundum crystals to protect the mullite and/or corundum crystals. The ZRM material has the properties such as high corrosion-resistance and low coefficient of thermal expansion.

The reasons for which the ZRM material is specified as having the composition which comprises, based on the weight of the material, 30–80% by weight of $Al_2O_3$, 10–65% by weight of $ZrO_2$ and 5–25% by weight of $SiO_2$ and the ZRM is employed in the amount of 0–40% by weight in the refractory of the invention based on the weight of the latter are that when $ZrO_2$ is employed in an amount less than 10% by weight based on the weight of the ZRM material, it is seen that the amount of zirconia which deposits within the interior or on the outer surface of mullite or corundum crystals is small which not only loses the feature of low coefficient of thermal expansion, but also reduces the corrosion resistance. On the other hand, when $ZrO_2$ is employed in excess of 65% by weight based on the weight of the ZRM material, the $ZrO_2$ is present in the form of monoclinic crystals which causes an abnormal expansion of the refractory resulting in reduction of the spalling resistance of refractory. And in order to cause the remaining mineral phase as mullite and corundum to coexist, the amounts of $Al_2O_3$ and $SiO_5$ should be 30–80% by weight and 5–25% by weight based on the weight of the ZRM material, respectively. Therefore, the ZRM material is employed in the amount of 0–40% by weight in the refractory based on the weight of the latter. When the amount of ZRM exceeds 40% by weight based on the weight of the refractory, the corrosion resistance of the refractory is adversely affected.

The sintered or electrofused alumina containing at least 90% by weight of $Al_2O_3$ based on the weight of the alumina is employed in the amount of 0–85% by weight based on the weight of the refractory according to the present invention. When the amount of the alumina exceeds 85% by weight based on the weight of the refractory, the spalling resistance of the refractory is insufficient. The reason for which the amount of $Al_2O_3$ in the sintered or electrofused alumina is specified as at least 90% by weight based on the weight of the latter is that the use of $Al_2O_3$ in such a great amount reduces the amount of impurities which may be casually get mixed in the alumina and would otherwise reduce the corrosion resistance of the refractory to a negligible value. In addition to the above-mentioned sintered and electrofused alumina, the present invention also contemplates the use of calcinated alumina within its broad scope. Second additional refractory materials comprising, based on the weight thereof, respectively, at least 50% by weight of $Al_2O_3$ and at least 10% by weight of $SiO_2$ are synthetic mullite, sillimanite and andalusite, for example. One or more of the second additional refractory materials are employed. The second additional refractory material or materials are employed in the amount of 0–30% by weight in the refractory based on the weight of latter. When the second additional refractory material or materials are employed in an amount in excess of 30% by weight based on the weight of the refractory, the amounts of the AZ material and alumina are reduced accordingly to thereby reduce the corrosion resistance of the resulting refractory. The reason for which the amounts of $Al_2O_3$ and $SiO_2$ in the optional refractory material are specified as mentioned hereinabove is to impart the resulting refractory with corrosion and spalling resistances in balanced or harmonized relationship.

The silicon-containing powder having the particle size less than $100\mu$ mesh and containing at least 80% by weight of silicon based on the weight of the powder is employed in the amount of 1–10% by weight based on the weight of the resulting refractory and when the powder is employed in an amount less than 1% by weight based on the weight of the resulting refractory, the absolute amount of silicon carbide produced by the reaction of the silicon with carbon and the firing of the reaction product are insufficient resulting in reduction of the strength of the resulting refractory. On the other hand, when the amount of the silicon-containing powder exceeds 10% by weight based on the resulting refractory, the corrosion resistance of the resulting refractory will be reduced. Samples of the silicon-containing power are metal silicon, silicon alloy and organic silicon high molecular compound and one or more of these members are selectively employed,. The reason for which the amount of silicon in the silicon-containing powder is specified as at least 80% by weight based on the weight of the powder is that if the amount of the silicon is below the specified value the reactivity of the silicon with carbon is low and a corresponding increase in the amount of impurities would reduce the heat resistance of the resulting refractory. And the reason for which the particle size of the silicon-containing powder is specified as less than 100 mesh is that when the particle size exceeds 100 mesh, the reactivity of the silicon in the powder with carbon reduces to the degree that a portion of the silicon tends to remain unreacted which would lead to the lowering of the strength and corrosion resistance of the resulting refractory. Thus, the particle size of the silicon-containing powder is preferably less than 100 mesh.

The carbon powder comprising 80% by weight of fixed carbon based on the weight of the powder is employed in the amount of 1–15% by weight based on the weight of the resulting refractory. When the carbon powder is employed in an amount less than 1% by weight based on the refractory, the reaction of the carbon with the silicon provides an insufficient strength to the resulting refractory and the corrosion resistance to be imparted by the carbon to the refractory is also insufficient. On the other hand, any amount of the carbon powder exceeding 15% by weight based on the resulting refractory tends to reduce the strength and acid resistance of the refractory.

The carbon powders useful in the refractory sliding nozzle plate of the present invention include scalelike graphite, earthly graphite, artificial graphite, kish graphite, pyrolysis graphite, petroleum pitch coke, coal coke, anthracite coal, carbon black, charcoal, pyrolysis carbon of carbohydrate, pyrolysis carbon of hydrocarbon, pyrolysis carbon of synthetic resin and glassy carbon and one or more of these carbon powders are selectively employed. The reason for which the amount of the fixed carbon in the carbon powder is specified as at least 80% by weight based on the weight of the latter is to prevent the reduction in the reactivity of the carbon with the silicon and in the corrosion resistance of the resulting refractory. Similarly, the reason for which the particle size of the carbon powder is specified as less than 100 mesh is to accelerate reaction between the carbon and silicon and to smoothly increase the strength of the resulting refractory through the reaction of the carbon with the silicon and the firing of the obtained reaction product.

The above-mentioned refractory components in the specified amounts and particle size are admixed and kneaded in the presence of a binder such as resin or pitch at cold temperature or under heating to provide a blend. When the resin is employed as the binder, phenol resin is preferably employed taking the amount of the fixed carbon and cost into consideration and when the pitch is employed as the binder, a pitch of high softening point containing a great amount of fixed carbon is preferably employed.

The thus obtained blend is formed into a desired shape in a forming press which is applied pressure on the upper or lower surface thereof or alternately on both the upper and lower surfaces thereof. The forming press may be a friction press, oil press, crank press or Boyd press. The formed product is left as it is or heated to a temperature ranging from 40°–60° C. until the volatile matter or matters in the formed product evaporate to the degree not to impede the firing of the formed product. Thereafter, the formed product is fired in a non-oxidizing atmosphere. Examples of the non-oxidizing atmosphere are a reduction atmosphere in which the formed product is embedded in carbon, an inactive gas flow of argon or the like, a gas flow of silicon chloride and a nitrogen gas flow. However, in the inactive, silicon and nitrogen gas flows, the firing cost of the formed product is very high. Furthermore, in the silicon gas flow, since the formed product contains carbon, the silicon carbonate as the reaction product is maldistributed on the surface of the produced brick or refractory whereby the corrosion resistance of the produced refractory is adversely affected. Thus, according to the present invention, in order to produce a fired product or refractory having satisfactory quality and properties at less expense, it is considered that the formed product is optimumly fired in the reduction atmosphere of carbon.

The thus obtained SN system refractory sliding nozzle plate is usually impregnated with one or more members selected from the group consisting of tar, pitch, alumina sol, silica sol, synthetic resin and organic silicon high molecular compounds depending upon the application of the refractory. In case of non-huming refractory, the above-mentioned refractory production process further includes the step in which the volatile matter or matters of the refractory are removed.

Examples of the present invention will be given hereinbelow:

In these examples, the kneading was conducted in a low-turn mixer and phenol resin or pitch was used as the binder. The refractory was formed into a plate in a friction press and then heat-treated at about 100° C. The firing was conducted in the reduction atmosphere with the formed product embedded in coke and the fired product or refractory was impregnated with pitch being followed by heat treatment to remove the volatile matter or matters contained in the impregnating pitch. The refractories of the invention and Control were compared with each other for determining various properties and the comparison results are shown in Table 2 given below. From Table 2, it is seen that the refractories of the present invention are superior to Control with respect to low coefficients of thermal expansion and high spalling and corrosion resistances.

Examples 2 and 5 were applied to large ladle in an iron works and these Examples showed improved durability by about 20% over that of Control (a conventional non-fuming carbon bond refractory). Examples showed no cracks, no surface roughness in the slide surfaces and very slight enlargement in nozzle opening diameter.

TABLE 2

Comparison between Properties of Inventive Refractory Sliding Nozzle Plates and Control for SN System

| Item | Example 1 | Example 2 | Example 3 | Example 4 | Example 5 | Example 6 | Control |
|---|---|---|---|---|---|---|---|
| AZ-4 | 35% by wt | — | — | — | — | 35% by wt | — |
| AZ-9 | — | 35% by wt | 35% by wt | 18% by wt | 18% by wt | — | — |
| Sintered alumina | 35% by wt | 35% by wt | 35% by wt | 53% by wt | 63% by wt | 35% by wt | 60% by wt |
| ZRM material | 20% by wt | 20% by wt | — | 20% by wt | 10% by wt | 20% by wt | — |
| Synthetic mullite | — | — | 20% by wt | — | — | — | 30% by wt |
| Carbon powder | 5% by wt | 5% by wt | 5% by wt | 5% by wt | 5% by wt | 5% by wt | 5% by wt |
| Silicon powder | 5% by wt | 5% by wt | 5% by wt | 5% by wt | 5% by wt | 5% by wt | 5% by wt |
| Phenol resin | +6% by wt | +6% by wt | +6% by wt | +6% by wt | +6% by wt | — | — |
| Pitch | — | — | — | — | — | +8% by wt | +8% by wt |
| Apparent specific gravity (g/cm$^3$) | 4.41 | 3.48 | 3.39 | 3.42 | 3.43 | 3.39 | 3.12 |
| Bulk specific gravity (g/cm$^3$) | 3.09 | 3.15 | 2.99 | 3.15 | 3.16 | 3.05 | 2.78 |
| Apparent porosity (%) | 9.4 | 9.5 | 11.8 | 7.8 | 7.9 | 10.0 | 10.8 |
| Compressive strength (kg/cm$^2$) | 2237 | 2230 | 1999 | 2340 | 2268 | 2381 | 1526 |
| Modulus of rupture (kg/cm$^2$): normal temperature | 310 | 302 | 280 | 311 | 373 | 330 | 240 |
| at 1400° C. | 242 | 235 | 215 | 240 | 199 | 258 | 174 |
| Corrosion index (assuming that index of conventional refractory is 100) | 93 | 93 | 94 | 93 | 90 | 95 | 100 |
| Spalling test (1500° C. for 10 min.) | excellent | excellent | excellent | good | good | excellent | rather good |
| Coefficient of thermal expansion (%) at 1500° C. | +0.84 | +0.83 | +0.80 | +0.95 | +0.95 | +0.85 | +1.00 |

While several examples of the invention have been described, it will be understood that the same are for illustration purpose only and not to be taken as a definition of the invention, reference being had for this purpose to the appended claims.

What is claimed is:

1. A refractory sliding nozzle plate for use in casting of molten metal, based on the weight of said refractory, comprising,
   (A) 5-90% by weight of refractory material consisting of corundum and monoclinic zirconia as principal mineral phase and having the composition including 80-98% by weight of $Al_2O_3$ and 2-20% by weight of $ZrO_2$ based on the weight of said refractory material;
   (B) 1-10% by weight of silicon-containing powder containing at least 80% by weight of silicon based on the weight of said powder and having a particle size less than and up to 100 mesh; and
   (C) 1-15% by weight of carbon powder containing at least 80% by weight of fixed carbon based on the weight of siad carbon powder and having a particle size less than and up to 100 mesh.

2. The refractory sliding nozzle plate for use in casting of molten metal as set forth in claim 1, further comprising,
   (D) up to 40% by weight of a first additional refractory material, based on the weight of said refractory, comprising mullite, baddellite and corundum as principal mineral phase and having the composition including, based on the weight of said first additional refractory material, 30-80% by weight of $Al_2O_3$, 10-65 by weight of $ZrO_2$ and 5-25% by weight of $SiO_2$.

3. The refractory for use in casting of molten metal as set forth in claim 1, further comprising,
   (E) up to 85% by weight, based on the weight of said refractory, of a sintered, electrofused or calcinated alumina containing at least 90% by weight of $Al_2O_3$ based on the weight of said alumina.

4. The refractory sliding nozzle plate for use in casting of molten metal as set forth in claim 1, further comprising,
   (F) up to 30% by weight of at least one second additional refractory material, based on the weight of said refractory, containing at least 50% by weight of $Al_2O_3$ and at least 10% by weight of $SiO_2$ based on the weight of said second additional refractory material.

5. The refractory sliding nozzle plate for use in casting of molten metal as set forth in claim 3, in which said alumina is sintered alumina.

6. The refractory sliding nozzle plate for use in casting of molten metal as set forth in claim 3, in which said alumina is electrofused alumina.

7. The refractory sliding nozzle plate for use in casting of molten metal as set forth in claim 1, further comprising, based on the weight of said refractory,
   (D) up to 40% by weight of a first additional refractory material comprising mullite, baddellite and corundum as principal mineral phase and containing, based on the weight of said first additional refractory material, 30-80% by weight of $Al_2O_3$, 10-65% by weight of $ZrO_2$ and 5-25% by weight of $SiO_2$; and (F) up to 30% by weight of at least one second additional refractory material including, based on the weight of said second additional refractory material, at least 50% by weight of $Al_2O_3$ and at least 10% by weight of $SiO_2$.

8. The refractory sliding nozzle plate for use in casting of molten metal as set forth in claim 1, further comprising, based on the weight of said refractory, (D) up to 40% by weight of a first additional refractory material comprising mullite, baddellite and corundum as principal mineral phase and including, based on the weight of said first additional refractory material, 30–80% by weight of $Al_2O_3$, 10–65% by weight of $ZrO_2$ and 5–25% by weight of $SiO_2$;

(E) up to 85% by weight, based on the weight of said refractory, of a sintered, electrofused or calcinated alumina containing at least 90% by weight of $Al_2O_3$, based on the weight of said alumina; and (F) up to 30% by weight of at least one second additional refractory material containing, based on the weight of said second additional refractory material, at least 50% by weight of $Al_2O_3$ and at least 10% by weight of $SiO_2$.

9. The refractory sliding nozzle plate for use in casting of molten metal as set forth in claim 1, in which said silicon-containing powder is one or more selected from the group consisting of metal silicon, silicon alloy and organic silicon high molecular compounds.

10. The refractory sliding nozzle plate for use in casting of molten metal as set forth in claim 1, in which said carbon powder is a member selected from the group consisting of scalelike graphite, earthly graphite, artificial graphite, kish graphite, pyrolysis graphite, petroleum pitch coke, coal coke, anthracite coal, carbon black, charcoal, pylolysis carbon of carbohydrate, pyrolysis carbon of hydrocarbon, pyrolysis carbon of synthetic resin and glassy carbon.

* * * * *